(12) United States Patent
Wada et al.

(10) Patent No.: US 9,705,696 B2
(45) Date of Patent: Jul. 11, 2017

(54) MONITORING SYSTEM

(71) Applicant: Panasonic Intellectual Property Management Co., Ltd., Osaka (JP)

(72) Inventors: Nobuyuki Wada, Fukuoka (JP); Daisuke Wakeyama, Fukuoka (JP); Hiroshi Tsuji, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/680,928

(22) Filed: Apr. 7, 2015

(65) Prior Publication Data
US 2016/0149719 A1 May 26, 2016

(30) Foreign Application Priority Data

Nov. 21, 2014 (JP) .................. 2014-237042

(51) Int. Cl.
H04N 7/18 (2006.01)
H04L 12/28 (2006.01)
G08B 13/196 (2006.01)

(52) U.S. Cl.
CPC .... *H04L 12/2825* (2013.01); *G08B 13/19656* (2013.01); *G08B 13/19658* (2013.01); *G08B 13/19682* (2013.01); *G08B 13/19684* (2013.01); *G08B 13/19693* (2013.01); *H04N 7/18* (2013.01); *H04N 7/181* (2013.01); *H04N 7/186* (2013.01)

(58) Field of Classification Search
None
See application file for complete search history.

(56) References Cited

U.S. PATENT DOCUMENTS 8,144,184 B2 * 3/2012 Carter .................. H04M 11/025
348/14.06
8,872,915 B1 10/2014 Scalisi et al.
(Continued)

FOREIGN PATENT DOCUMENTS

JP 2002-290577 A 10/2002
JP 2007-323533 A 12/2007

OTHER PUBLICATIONS

Anonymous, "Withings Smart Baby Monitor", Jan. 2, 2013 (Jan. 2, 2013), Internet Retrieved from the Internet: URL: https://withings.zendesk.com/hc/en-us/article_attachments/201276457/Smart_Baby_Monitor_Quick_Start_Guide_-_low.pdf [retrieved on May 21, 2015] pp. 1,3,9 (64 pages).
(Continued)

*Primary Examiner* — Mohammad J Rahman
(74) *Attorney, Agent, or Firm* — Seed IP Law Group LLP

(57) ABSTRACT

In a monitoring system, a master device transmits predetermined sound source list data to a mobile phone terminal in response to a first operation on a display/input unit. The mobile phone terminal displays the predetermined sound source list data transmitted from the master device on the display/input unit, and transmits information regarding a selected sound source to the master device in response to an operation of selecting one sound source from the sound source list data. When the information regarding the sound source is received from the mobile phone terminal, the master device outputs selection audio data corresponding to the information regarding the selected sound source from a speaker of a monitoring camera.

18 Claims, 11 Drawing Sheets

(56) References Cited

U.S. PATENT DOCUMENTS

| | | | |
|---|---|---|---|
| 9,060,104 B2* | 6/2015 | Scalisi | H04N 7/186 348/143 |
| 9,113,051 B1* | 8/2015 | Scalisi | H04N 7/185 |
| 9,113,052 B1* | 8/2015 | Scalisi | H04N 7/186 |
| 9,118,819 B1* | 8/2015 | Scalisi | H04N 7/186 |
| 9,160,987 B1* | 10/2015 | Kasmir | H04N 7/186 |
| 9,172,920 B1* | 10/2015 | Kasmir | H04M 1/0291 |
| 9,172,921 B1* | 10/2015 | Scalisi | H04M 11/025 |
| 9,172,922 B1* | 10/2015 | Kasmir | H04L 12/2827 |
| 9,179,107 B1* | 11/2015 | Scalisi | G08B 7/064 |
| 9,179,108 B1* | 11/2015 | Scalisi | G08B 7/064 |
| 9,179,109 B1* | 11/2015 | Kasmir | G08B 3/10 |
| 9,196,133 B2* | 11/2015 | Scalisi | G08B 3/10 |
| 9,197,867 B1* | 11/2015 | Scalisi | H04N 7/188 |
| 9,230,424 B1* | 1/2016 | Scalisi | G08B 27/005 |
| 9,237,318 B2* | 1/2016 | Kasmir | H04N 5/33 |
| 9,247,219 B2* | 1/2016 | Kasmir | G08B 3/10 |
| 9,253,455 B1* | 2/2016 | Harrison | H04M 1/0291 |
| 9,262,666 B2* | 2/2016 | Frye | G06K 9/0004 |
| 9,342,936 B2* | 5/2016 | Scalisi | E05B 47/026 |
| 9,418,525 B2* | 8/2016 | Wakeyama | G08B 13/19684 |
| 2004/0229569 A1* | 11/2004 | Franz | H04M 3/16 455/66.1 |
| 2005/0262519 A1 | 11/2005 | Luebke et al. | |
| 2006/0234602 A1* | 10/2006 | Palmquist | A63H 3/003 446/297 |
| 2007/0190494 A1* | 8/2007 | Rosenberg | A63F 13/12 434/11 |
| 2009/0141939 A1* | 6/2009 | Chambers | G08B 13/19613 382/103 |
| 2009/0243834 A1 | 10/2009 | Sennett et al. | |
| 2010/0195810 A1* | 8/2010 | Mota | H04N 7/186 379/167.12 |
| 2010/0245536 A1* | 9/2010 | Huitema | H04N 7/147 348/14.08 |
| 2011/0022681 A1* | 1/2011 | Simeonov | G06Q 30/02 709/217 |
| 2012/0162416 A1* | 6/2012 | Su | G06T 7/2053 348/143 |
| 2013/0036207 A1* | 2/2013 | Wendt | H04L 67/327 709/220 |
| 2013/0045763 A1* | 2/2013 | Ruiz | H04N 7/186 455/466 |
| 2013/0057695 A1* | 3/2013 | Huisking | H04N 7/186 348/156 |
| 2013/0210531 A1* | 8/2013 | Ivanov | G07F 17/3269 463/43 |
| 2014/0256214 A1* | 9/2014 | Ramamoorthy | A63H 3/28 446/297 |
| 2015/0339912 A1* | 11/2015 | Farrand | G08B 25/00 340/501 |
| 2016/0015278 A1* | 1/2016 | Campo | G06K 9/0053 348/143 |
| 2016/0148478 A1* | 5/2016 | Wakeyama | G08B 13/19684 348/152 |

OTHER PUBLICATIONS

International Search Report and Written Opinion mailed Jul. 31, 2015, for corresponding International Application No. PCT/JP2015/001266, 16 pages.
Cenelec, "SmartHouse Code of Practice," Cenelec Workshop Agreement (CWA 50487), Nov. 2005, 230 pages.
Home Gateway Initiative, "Home Gateway Technical Requirements: Residential Profile," Version 1.0, Apr. 29, 2008, 125 pages.
Extended European Search Report, dated Apr. 21, 2016, for corresponding EP Application No. 15194973.2-1810, 18 pages.

* cited by examiner

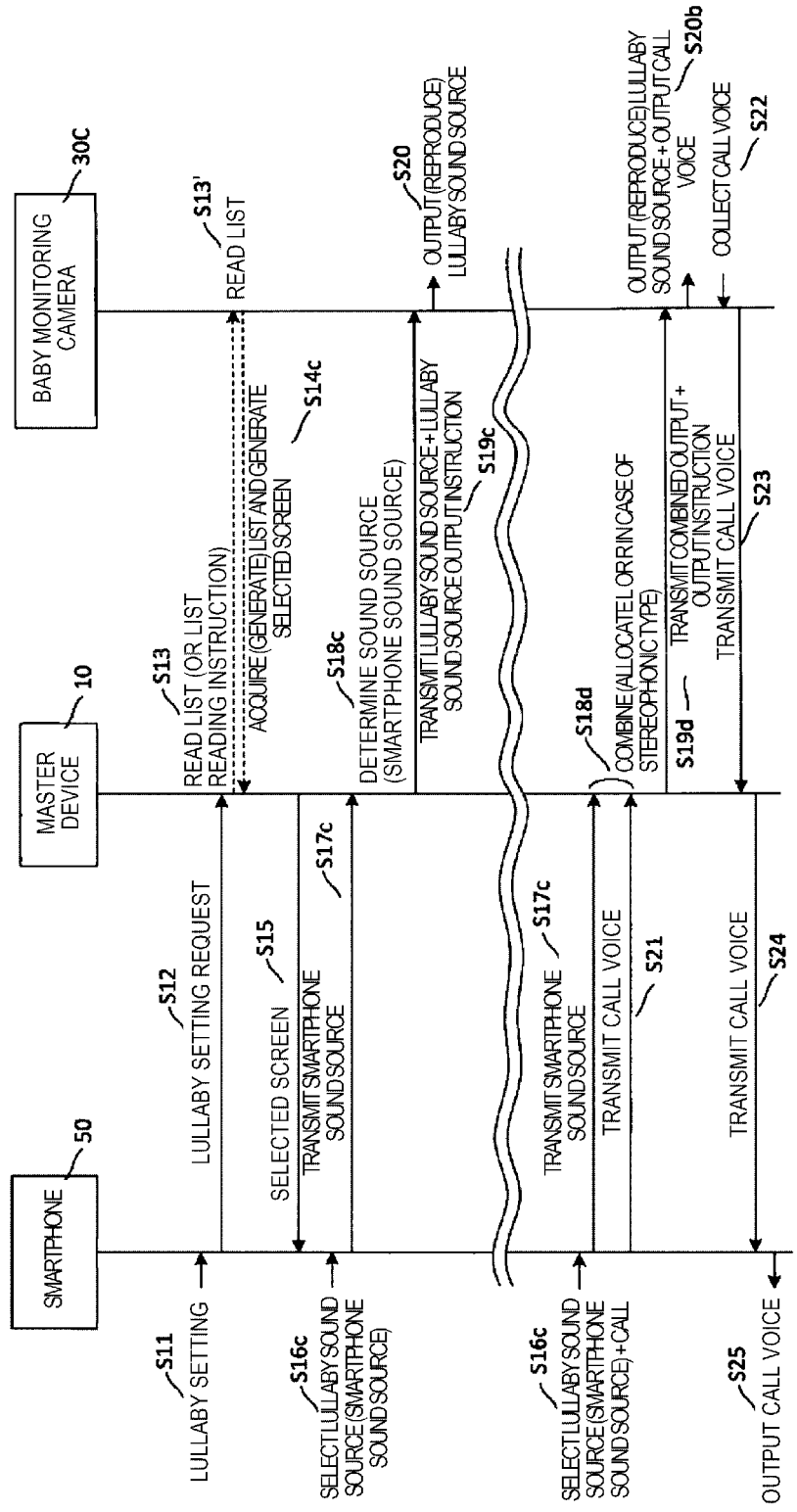

MONITORING SYSTEM

BACKGROUND OF THE INVENTION

1. Field of the Invention

The present invention relates to a monitoring system which performs data input and output between a mobile phone terminal and a camera.

2. Description of the Related Art

In the related art, as an example of a monitoring system in which data input and output are performed between a mobile phone terminal and a camera, there is a monitoring camera system which easily performs remote monitoring even from a remote location and monitors a monitoring target by using bidirectional communication of video and sound (for example, refer to Japanese Patent Unexamined Publication No. 2007-323533)

The monitoring system disclosed in Japanese Patent Unexamined Publication No. 2007-323533 includes a controller which is a monitoring server installed at an indoor distribution board in a predetermined house lot (within a house), a first camera unit which is an interphone slave device installed at an entrance door, a second camera unit which is installed in a dining room, a third camera unit which is installed in a bedroom, an indoor unit which is an interphone master device installed in a living room, and one or more mobile phones present at remote places. For example, in a case where a dweller is out, when each camera unit detects an intruder, the controller switches and transmits a captured video signal and a collected audio signal to the mobile phone so as to capture the intruder.

SUMMARY OF THE INVENTION

However, in the above-described configuration disclosed in Japanese Patent Unexamined Publication No. 2007-323533, since a video signal and an audio signal from each camera unit are appropriately switched and transmitted to the mobile phone so as to capture motions and sound of the intruder, a configuration of the controller is complex, and this inevitably leads to an increase in cost, and it is difficult to implement a monitoring system including the controller at low cost.

In order to solve the above-described problems, an object of the present invention is to provide a monitoring system which realizes data input and output between a mobile phone terminal and a camera at a low cost without damaging user's convenience by using an existing fixed telephone which is connected to a fixed telephone network and can perform calls to other fixed telephones.

According to the present invention, there is provided a monitoring system including a monitoring camera that includes a microphone, a speaker, and an image capturing unit and has a call function; a master device that communicates with the monitoring camera, and is connected to a fixed telephone network so as to perform calls to other fixed telephones; and a mobile phone terminal that includes a display/input unit, performs wireless communication with the master device by using a wireless router, and is connected to other mobile phones via a mobile phone network, in which the master device transmits predetermined sound source list data to the mobile phone terminal in response to a first operation on the display/input unit, in which the mobile phone terminal displays the predetermined sound source list data transmitted from the master device on the display/input unit, and transmits information regarding a selected sound source to the master device in response to an operation of selecting one sound source from the sound source list data, and in which, when the information regarding the sound source is received from the mobile phone terminal, the master device outputs selection audio data corresponding to the information regarding the selected sound source from the speaker of the monitoring camera.

According to the present invention, it is possible to realize data input and output between a mobile phone terminal and a camera at a low cost without damaging user's convenience by using an existing fixed telephone which is connected to a fixed telephone network and can perform calls to other fixed telephones.

BRIEF DESCRIPTION OF DRAWINGS

FIG. 11 is a sequence diagram illustrating an example of an operation procedure in the monitoring camera system of the present embodiment in a case where the selection target lullaby sound source is provided in the smartphone.

DETAILED DESCRIPTION OF THE PREFERRED EMBODIMENT

With reference to the drawings, a description will be made of an embodiment (hereinafter, referred to as "the present embodiment") of a monitoring camera system related to the present invention. In the following present embodiment, as an example of a monitoring camera system related to the present invention, an exemplary monitoring camera system used for home security will be described. The present invention is not limited to a monitoring camera system, and may be represented as each of devices constituting the monitoring camera system, a method for each device, and a program.

A monitoring system of the present embodiment includes a monitoring camera that includes a microphone, a speaker, and an image capturing unit and has a call function; a master device that communicates with the monitoring camera, and is connected to a fixed telephone network so as to perform calls to other fixed telephones; and a mobile phone terminal that includes a display/input unit, performs wireless communication with the master device by using a wireless router, and is connected to other mobile phones via a mobile phone network. The master device transmits predetermined sound source list data to the mobile phone terminal in response to a predetermined first operation on the display/input unit. The mobile phone terminal displays the predetermined sound source list data transmitted from the master device on the display/input unit, and transmits information regarding a selected sound source to the master device in response to an operation of selecting one sound source from the sound source list data. When the information regarding the sound source is received from the mobile phone terminal, the master device outputs selection audio data corresponding to the information regarding the selected sound source from the speaker of the monitoring camera.

Figure 1:
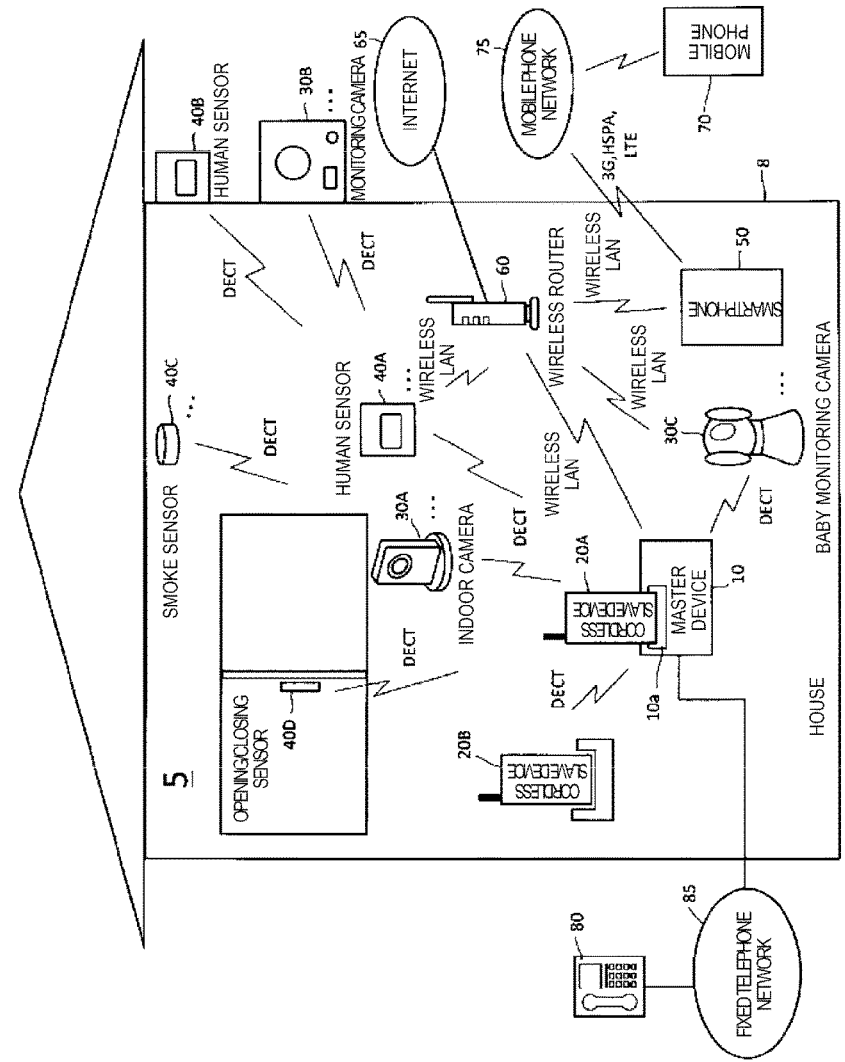
FIG. 1 is a diagram illustrating an example of a system configuration of a monitoring camera system of the present embodiment.

FIG. 1 is a diagram illustrating an example of a system configuration of monitoring camera system 5 of the present embodiment. Monitoring camera system 5 is mainly provided in house 8, and includes master device 10, two cordless slave devices 20A and 20B (hereinafter, simply referred to as "slave devices"), a plurality of cameras (specifically, indoor camera 30A, monitoring camera 30B, baby monitoring camera 30C, . . . ), various sensors (specifically, human sensors 40A and 40B, smoke sensor 40C, opening/closing sensor 40D, . . . ), smartphone 50, and wireless router 60. A configuration of monitoring camera system 5 is only an example and may be modified in various aspects.

Master device 10 which functions as a gateway in monitoring camera system 5 is a control device which controls the entire operation of monitoring camera system 5, and is connected to the slave devices, the cameras, the sensors, the smart plugs, and the like in a communicable manner by using a communication method such as digital enhanced cordless telecommunications (DECT). Master device 10 is connected to the Internet 65 via wireless router 60 using a wireless LAN. Master device 10 is connected to fixed telephone network 85 in a wired manner and can perform a call to fixed telephone 80. Master device 10 has a function of charging slave device 20A which is inserted into insertion port 10a.

Slave devices 20A and 20B are connected to master device 10 in the DECT communication method and can perform a call to master device 10. Particularly, in a case where two slave devices 20A and 20B are not required to be differentiated from each other, the slave devices are collectively referred to as slave device 20.

Various sensors 40 (specifically, human sensors 40A and 40B, smoke sensor 40C, opening/closing sensor 40D, . . . ) are connected to master device 10 in the DECT communication method. Herein, as sensors, opening/closing sensor 40D which detects opening and closing of a window, smoke sensor 40C which detects smoke, and human sensors 40A and 40B which detect a person with infrared rays are used. Particularly, in a case where the sensors are not required to be differentiated from each other, the sensors are collectively referred to as sensor 40. As will be described later, infrared sensor 313 (refer to FIG. 4) built into camera 30 is also used as a human sensor.

A plurality of cameras (specifically, indoor camera 30A, monitoring camera 30B, baby monitoring camera 30C, . . . ) have a call function and are connected to master device 10 in the DECT communication method. Herein, as cameras, monitoring camera 30B which captures an image of an outdoor environment, indoor camera 30A which captures an image of house 8, and baby monitoring camera 30C which captures an image of a sleeping location of an infant (for example, a baby bed (not illustrated) or the vicinity thereof), are used. Particularly, in a case where the cameras are not required to be differentiated from each other, the cameras are collectively referred to as camera 30.

Smartphone 50 is provided as an example of a mobile phone terminal. Smartphone 50 is connected to master device 10 via wireless router 60 using a wireless LAN, and is connected to mobile phone 70 or other smartphones via mobile phone network 75 using a communication method such as the third generation (3G) method, a high speed package access (HSPA) method, or a long term evolution (LTE) method.

Figure 2:
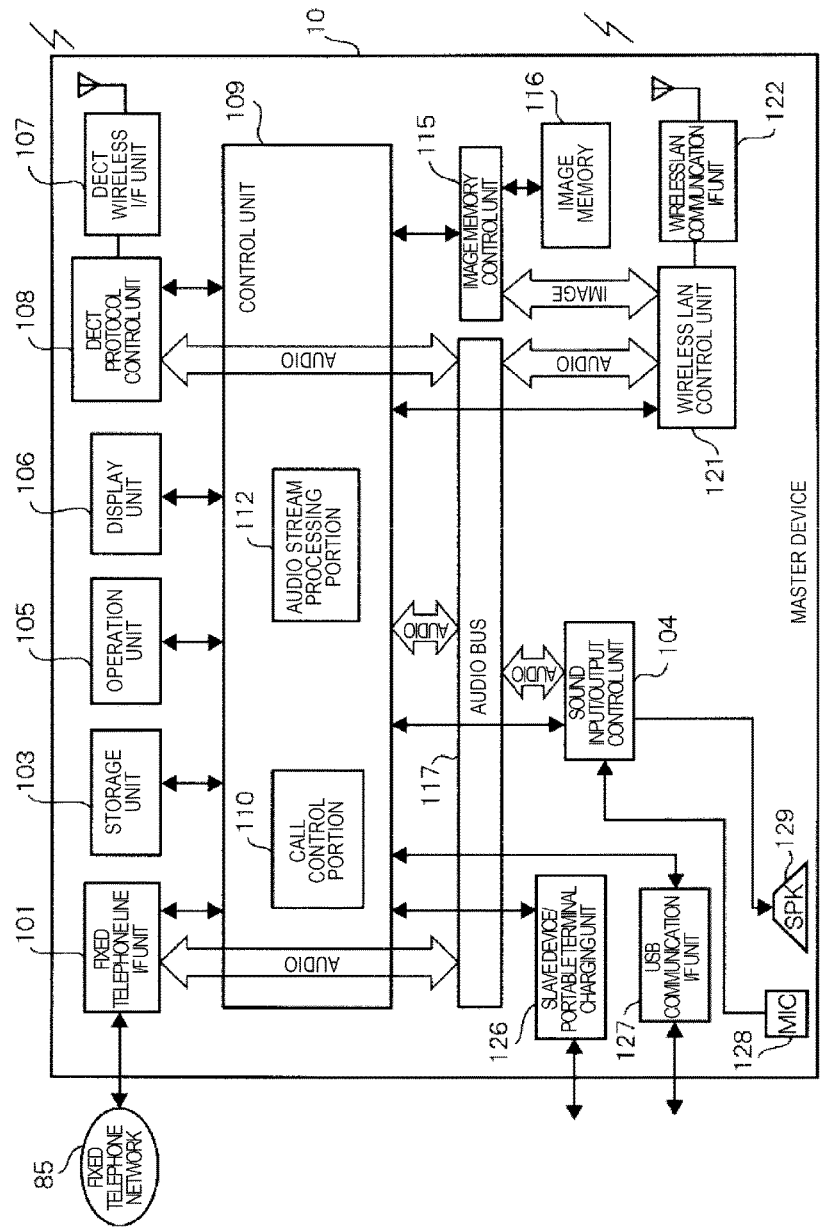
FIG. 2 is a block diagram illustrating an example of an internal configuration of a master device.

FIG. 2 is a block diagram illustrating an example of an internal configuration of master device 10. Master device 10 includes control unit 109, storage unit 103, operation unit 105, and display unit 106. Master device 10 receives various input operations and displays information such as an image or a lullaby sound source selection screen which will be described later on display unit 106. The lullaby sound source is audio data which can be output (reproduced) from camera 30 (for example, baby monitoring camera 30C), for example, audio data of a lullaby or the like sung to a baby. Control unit 109 has call control portion 110 and audio stream processing portion 112 built thereinto, and performs call control during calling, processing of audio data, and the like. Master device 10 stores, in storage unit 103, audio data of one or more lullaby sound sources which can be output from baby monitoring camera 30C.

Master device 10 includes image memory control unit 115 and image memory 116, and stores image data or the like captured by camera 30 in image memory 116.

Master device 10 includes wireless LAN control unit 121 and wireless LAN communication I/F unit 122, and transmits and receives image data and audio data to and from smartphone 50, camera 30, and the like via wireless router 60 connected over a wireless LAN.

Master device 10 includes DECT protocol control unit 108 and DECT wireless I/F unit 107, and performs wireless connection to slave device 20, sensor 40, and camera 30 by using a wireless method such as digital enhanced cordless telecommunications (DECT).

Master device 10 includes audio bus 117, sound input/output control unit 104, speaker 129, and microphone 128, and performs input and output of sound to and from an external device.

Master device 10 includes fixed telephone line I/F unit 101, and can perform a call to external fixed telephone 80 (refer to FIG. 1) connected to fixed telephone network 85.

Master device 10 includes slave device/portable terminal charging unit 126 and charges slave device 20 or smartphone 50 inserted into insertion port 10a.

Master device 10 includes USB communication I/F unit 127, and transmits and receives data to and from an apparatus, a memory, or the like having an interface of a universal serial bus (USB) standard.

Master device 10 registers pairs of various sensors 40 and the plurality of cameras 30 in storage unit 103 in correlation with each other. For example, human sensor 40B and monitoring camera 30B are installed at close locations outdoors and are thus registered in correlation with each other. Monitoring camera 30B, as will be described later, integrally has infrared sensor 313 (refer to FIG. 4) which is a human sensor and is built thereinto, and is thus also registered in correlation with infrared sensor 313. Human sensor 40A, smoke sensor 40C, and opening/closing sensor 40D are all installed inside house 8 and are thus registered in correlation with either indoor camera 30A or baby monitoring camera 30C.

Figure 3:
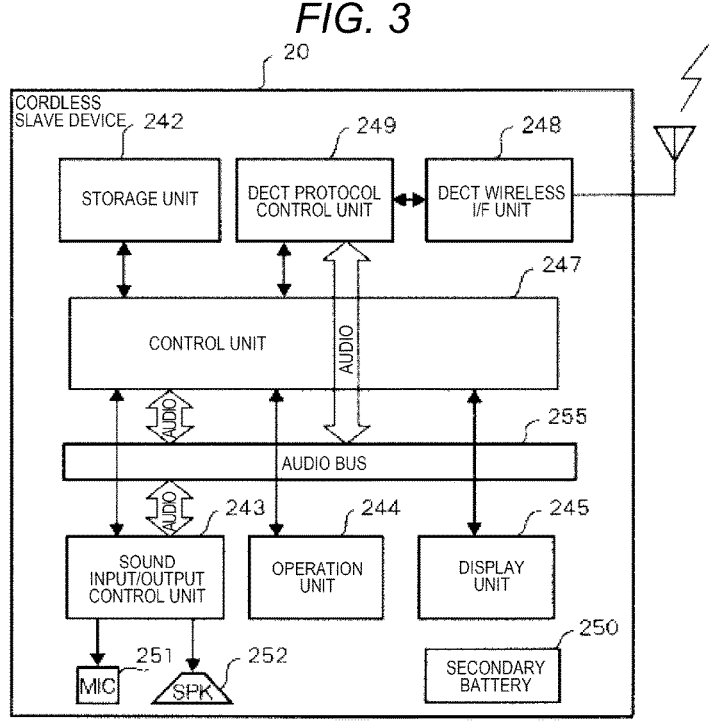
FIG. 3 is a block diagram illustrating an example of an internal configuration of a cordless slave device.

FIG. 3 is a block diagram illustrating an example of an internal configuration of (cordless) slave device 20. Slave device 20 includes control unit 247, storage unit 242, operation unit 244, and display unit 245. Slave device 20 receives various input operations and displays information such as an image or a lullaby sound source selection screen which will be described later on display unit 245. Slave device 20 stores, in storage unit 242, audio data of one or more lullaby sound sources which can be output from baby monitoring camera 30C.

Slave device 20 includes DECT protocol control unit 249 and DECT wireless I/F unit 248, and performs wireless connection to master device 10, sensor 40, and camera 30 by using a wireless method such as DECT.

Slave device 20 includes audio bus 255, sound input/output control unit 243, speaker 252, and microphone 251, and performs input and output of sound to and from an external device.

Slave device 20 includes secondary battery 250, and, in a case of being used as a cordless slave device, each unit of slave device 20 is supplied with power from secondary battery 250 so as to perform an operation.

Figure 4:
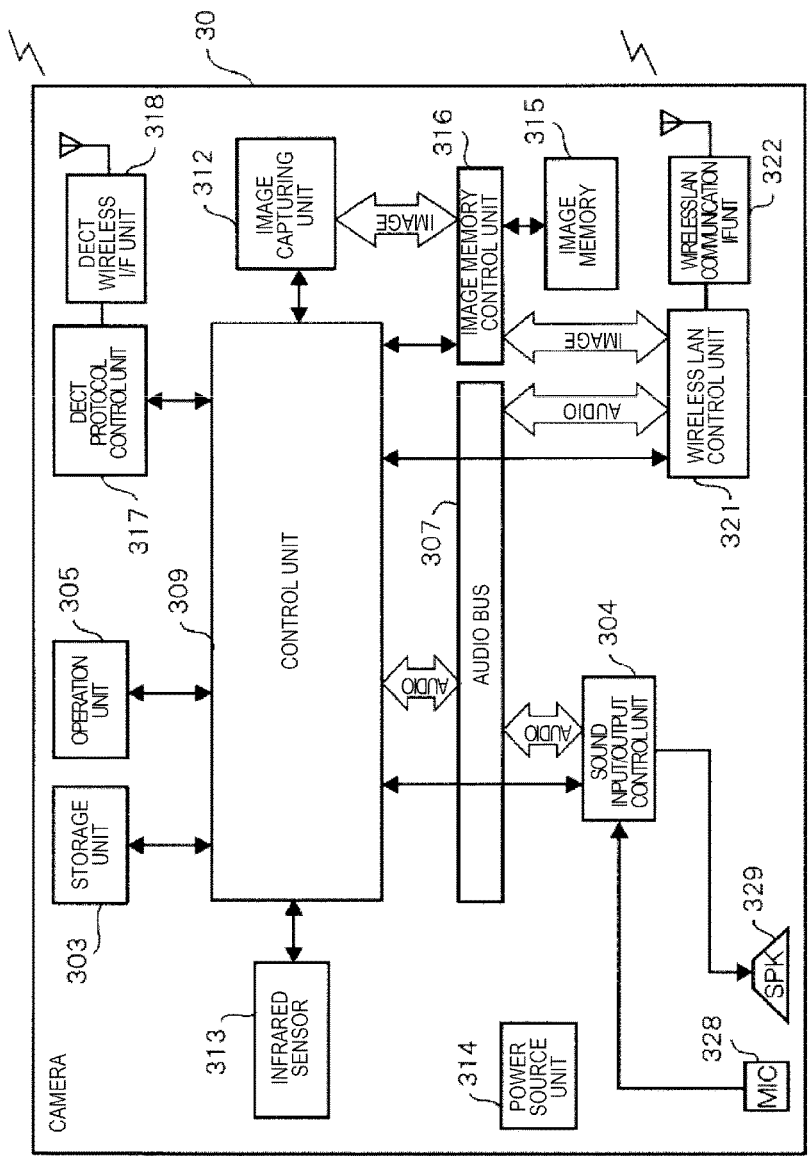
FIG. 4 is a block diagram illustrating an example of an internal configuration of a camera.

FIG. 4 is a block diagram illustrating an example of an internal configuration of camera 30. Indoor camera 30A, monitoring camera 30B, and baby monitoring camera 30C as examples of cameras 30 have substantially the same configuration as each other. Camera 30 includes control unit 309, storage unit 303, and operation unit 305. Camera 30 performs an operation related to image capturing and also receives input operations. Baby monitoring camera 30C stores, in storage unit 303, audio data of one or more lullaby sound sources which can be output from speaker 329 of baby monitoring camera 30C.

Camera 30 includes DECT protocol control unit 317 and DECT wireless I/F unit 318, and performs wireless connection to master device 10 by using a wireless method such as DECT.

Camera 30 includes wireless LAN control unit 321 and wireless LAN communication I/F unit 322, and transmits and receives image data and audio data to and from master device 10, smartphone 50, and the like via wireless router 60 connected over the wireless LAN.

Camera 30 includes audio bus 307, sound input/output control unit 304, speaker 329, and microphone 328, and performs input and output of sound to and from an external device. For example, camera 30 transmits audio data collected by microphone 328 to master device 10, and outputs audio data including selected audio data (which will be described later) transmitted from master device 10, from speaker 329.

Camera 30 includes image capturing unit 312, image memory control unit 316, and image memory 315, and stores image data captured by image capturing unit 312 in image memory 315. Image capturing unit 312 has a known image capturing mechanism and includes at least a lens and an imaging element (for example, an image sensor such as a charged coupled device (CCD) or a complementary metal oxide semiconductor (CMOS)).

Camera 30 integrally has infrared sensor 313 which is a passive infrared (PIR) sensor as a human sensor built thereinto. Infrared sensor 313 detects the presence of a person by detecting a change in heat (infrared ray) generated by the person. Camera 30 includes a power source unit 314 which is constituted by a commercial AC power source. However, infrared sensor 313 illustrated in FIG. 4 is not provided in baby monitoring camera 30C illustrated in FIG. 1.

Figure 5:
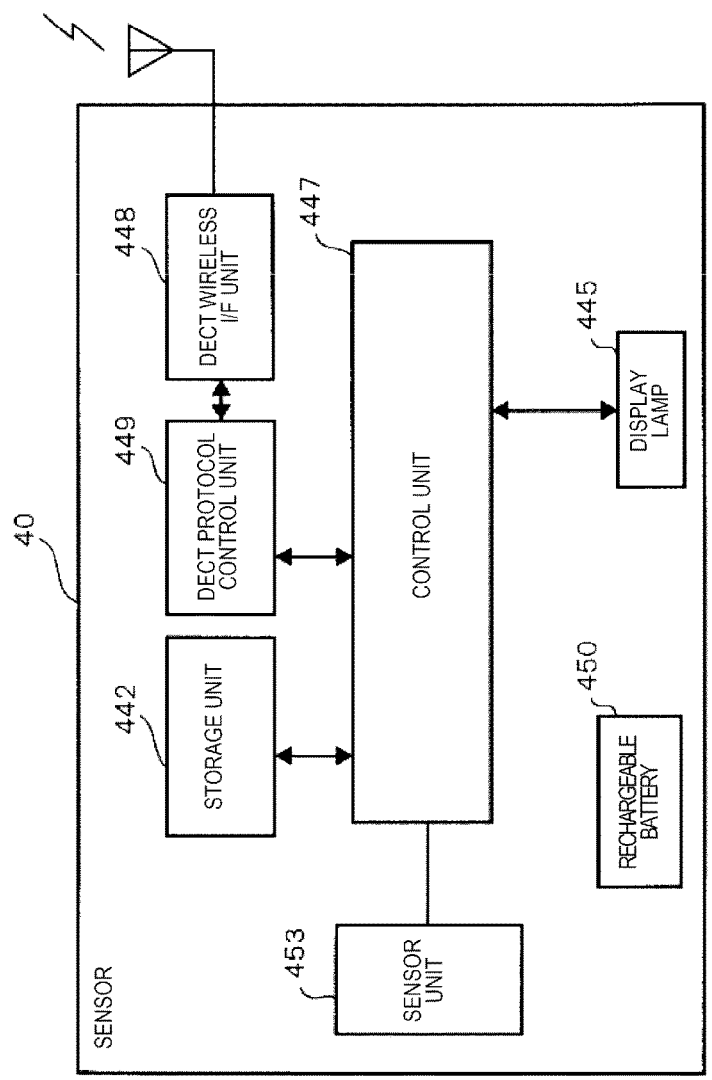
FIG. 5 is a block diagram illustrating an example of an internal configuration of a sensor.

FIG. 5 is a block diagram illustrating an example of an internal configuration of sensor 40. Sensor 40 includes control unit 447, storage unit 442, and display lamp 445. Sensor 40 performs a predetermined detection operation, such as turning on display lamp 445, in a case where a target (for example, an intruder which is also the same for the following description) is detected.

Sensor 40 includes DECT protocol control unit 449 and DECT wireless I/F unit 448, and performs wireless connection to master device 10 by using a wireless method such as DECT, and sends sensor detection information to master device 10 when a target is detected.

Sensor unit 453 differs depending on the kind of sensor 40. For example, in a case of human sensors 40A and 40B, sensor unit 453 is a PIR sensor which detects a person through a change in infrared rays. In a case of opening/closing sensor 40D which detects opening and closing of a front door, a window, or the like, sensor unit 453 is a reed switch which switches between turned-on and turned-off states due to opening and closing. In a case of smoke sensor 40C, sensor unit 453 is a light emitting/receiving unit which detects smoke when emitted light is blocked by the smoke. Secondary battery 450 is a rechargeable battery and supplies power to each unit. Sensor unit 453 may be a temperature sensor which can detect an ambient temperature.

Figure 6:
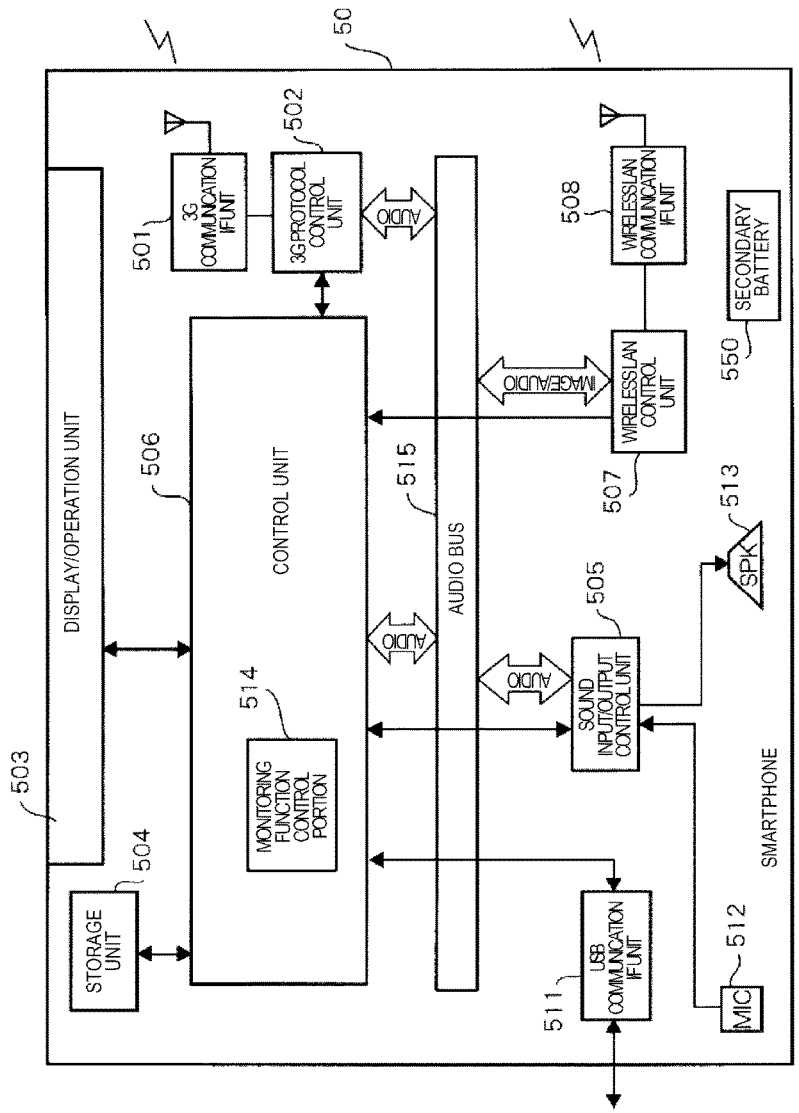
FIG. 6 is a block diagram illustrating an example of an internal configuration of a smartphone.

FIG. 6 is a block diagram illustrating an example of an internal configuration of smartphone 50. Smartphone 50 as a mobile phone terminal includes control unit 506, storage unit 504, and display/operation unit (for example, touch panel) 503. Smartphone 50 receives various input operations and displays information such as an image or a lullaby sound source selection screen which will be described later on display/operation unit 503. Monitoring function control portion 514 which can set a function of camera 30 as described later is built into control unit 506. Display/operation unit 503 configured by the touch panel, which is a display/input unit into which a display unit and an operation unit are integrated, displays information such as an image or an icon on a screen, and receives a tap operation (or a touch operation) on a screen performed by a user of smartphone 50 (hereinafter, simply referred to as a "user"). Smartphone 50 stores, in storage unit 504, audio data of one or more lullaby sound sources which can be output from baby monitoring camera 30C.

Smartphone 50 includes 3G protocol control unit 502 and 3G wireless I/F unit 501, and performs wireless connection to mobile phone 70 or other smartphones connected to mobile phone network 75, by using a third generation (3G) wireless communication method. Smartphone 50 may include a protocol control unit and a wireless I/F unit corresponding to a wireless communication method (for example, HSPA or LTE) other than the 3G method.

Smartphone 50 includes audio bus 515, sound input/output control unit 505, speaker 513, and microphone 512, and performs input and output of sound to and from an external device. For example, smartphone 50 transmits audio data of a user collected by microphone 512 to master device 10, receives audio data of a call party collected by camera 30 (for example, baby monitoring camera 30C) from master device 10, and outputs the audio data transmitted from master device 10, from speaker 329.

Smartphone 50 includes wireless LAN control unit 507 and wireless LAN communication I/F unit 508, and transmits and receives image data and audio data to and from master device 10 or camera 30 via wireless router 60 connected over the wireless LAN.

Smartphone 50 includes USB communication I/F unit 511, and transmits and receives data to and from an apparatus, a memory, or the like having an interface of a universal serial bus (USB) standard.

Next, a description will be made of examples of various screens displayed on smartphone 50 with reference to FIGS. 7A, 7B, 7C and 8.

Figure 7A:
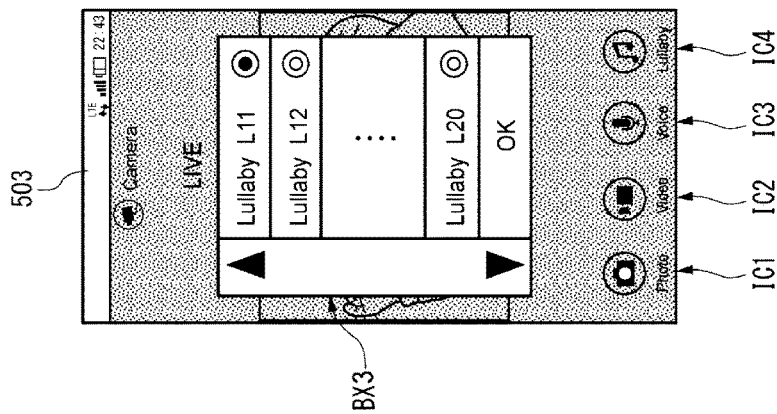
FIG. 7A is a diagram illustrating an example of a lullaby sound source selection screen on which a lullaby sound source list including a selection target lullaby sound source of the master device is displayed on the smartphone.
Figure 7B:
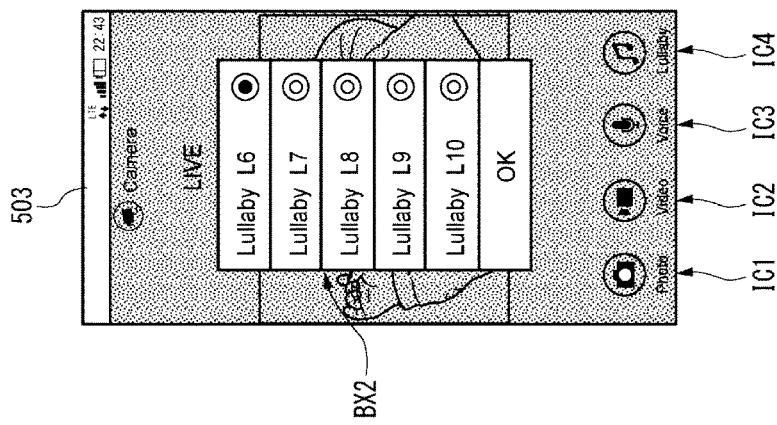
FIG. 7B is a diagram illustrating an example of a lullaby sound source selection screen on which a lullaby sound source list including a selection target lullaby sound source of a baby monitoring camera is displayed on the smartphone.
Figure 7C:
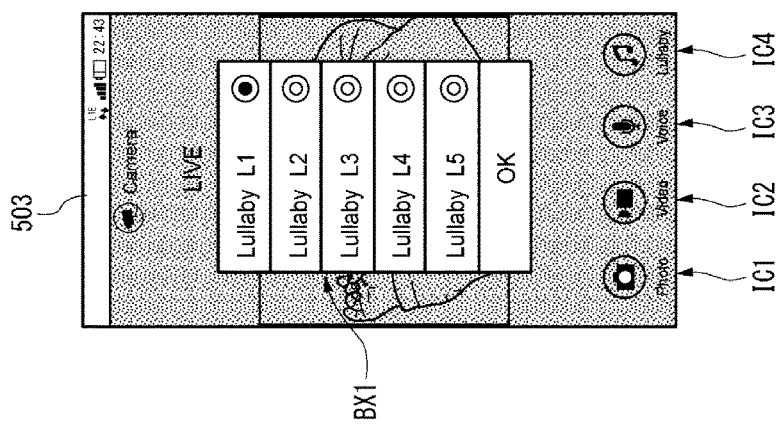
FIG. 7C is a diagram illustrating an example of a lullaby sound source selection screen on which a lullaby sound source list including a selection target lullaby sound source of the smartphone is displayed on the smartphone.

First, with reference to FIGS. 7A to 7C, a description will be made of a lullaby sound source selection screen on which a lullaby sound source list including a lullaby sound source which can be output from camera 30 (for example, baby monitoring camera 30C) is displayed. FIG. 7A is a diagram illustrating an example of a lullaby sound source selection screen on which lullaby sound source list BX1 including a selection target lullaby sound source of master device 10 is displayed on smartphone 50. FIG. 7B is a diagram illustrating an example of a lullaby sound source selection screen on which lullaby sound source list BX2 including a selection target lullaby sound source of baby monitoring camera 30C is displayed on smartphone 50. FIG. 7C is a diagram illustrating an example of a lullaby sound source selection screen on which lullaby sound source list BX3 including a selection target lullaby sound source of smartphone 50 is displayed on smartphone 50. A lullaby sound source which is selected by the user so as to be set as a target of output (reproduction) in baby monitoring camera 30C is referred to as a "selection target lullaby sound source".

Display/operation unit 503 of smartphone 50 illustrated in FIG. 7A displays, for example, a lullaby sound source selection screen including lullaby sound source list BX1 of a total of five sings including the name "Lullaby L1", the name "Lullaby L2", the name "Lullaby L3", the name "Lullaby L4", and the name "Lullaby L5", as lullaby sound sources. One lullaby sound source can be selected on the lullaby sound source selection screen according to a user's input operation. Display/operation unit 503 of smartphone 50 illustrated in FIG. 7A displays Photo icon IC1, Video icon IC2, Voice icon IC3, and Lullaby icon IC4 so as not to be selectable. For example, in a case where the user performs a selection operation on the name "Lullaby L1", smartphone 50 transmits information (for example, the name "Lullaby L1" of the lullaby sound source) regarding the selected lullaby sound source to master device 10. In FIG. 7A, audio data (selected audio data) corresponding to the name "Lullaby L1" which is the selection operation target is stored in storage unit 103 of master device 10.

Display/operation unit 503 of smartphone 50 illustrated in FIG. 7B displays, for example, a lullaby sound source selection screen including lullaby sound source list BX2 of a total of five sings including the name "Lullaby L6", the name "Lullaby L7", the name "Lullaby L8", the name "Lullaby L9", and the name "Lullaby L10", as lullaby sound sources. One lullaby sound source can be selected on the lullaby sound source selection screen according to a user's input operation. Display/operation unit 503 of smartphone 50 illustrated in FIG. 7B displays Photo icon IC1, Video icon IC2, Voice icon IC3, and Lullaby icon IC4 so as not to be selectable, in the same manner as in FIG. 7A. For example, in a case where the user performs a selection operation on the name "Lullaby L6", smartphone 50 transmits information (for example, the name "Lullaby L6" of the lullaby sound source) regarding the selected lullaby sound source to master device 10. In FIG. 7B, audio data (selected audio data) corresponding to the name "Lullaby L6" which is the selection operation target is stored in storage unit 303 of baby monitoring camera 30C.

Display/operation unit 503 of smartphone 50 illustrated in FIG. 7C displays, for example, a lullaby sound source selection screen including lullaby sound source list BX3 of a total of ten sings including the name "Lullaby L11", the name "Lullaby L12", . . . and the name "Lullaby L20", as lullaby sound sources. One lullaby sound source can be selected on the lullaby sound source selection screen according to a user's input operation. Display/operation unit 503 of smartphone 50 illustrated in FIG. 7C displays Photo icon IC1, Video icon IC2, Voice icon IC3, and Lullaby icon IC4 so as not to be selectable. For example, in a case where the user performs a selection operation on the name "Lullaby L11", smartphone 50 transmits information (for example, the name "Lullaby L11" of the lullaby sound source) regarding the selected lullaby sound source to master device 10. In FIG. 7C, audio data (selected audio data) corresponding to the name "Lullaby L11" which is the selection operation target is stored in storage unit 504 of smartphone 50.

Figure 8:
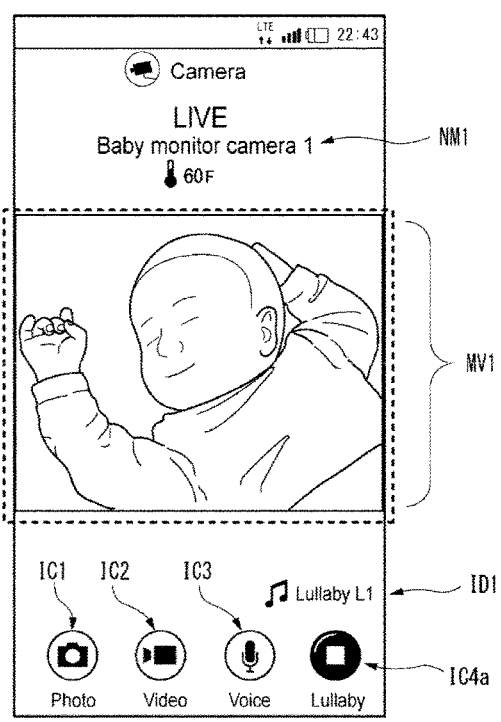
FIG. 8 is a diagram illustrating an example of a live monitoring screen displayed on the smartphone during recording performed by the baby monitoring camera.

Next, with reference to FIG. 8, a description will be made of a live monitoring screen on which real-time image data captured by camera 30 (for example, baby monitoring camera 30C) is displayed in smartphone 50. FIG. 8 is a diagram illustrating an example of a live monitoring screen displayed on smartphone 50 during recording performed by baby monitoring camera 30C.

Display/operation unit 503 of smartphone 50 illustrated in FIG. 8 displays a real-time image (or a video) MV1 recorded by baby monitoring camera 30C, and also displays the name (for example, baby monitoring camera 30C) NM1 of camera 30 which captures the image. Display/operation unit 503 of smartphone 50 may also display information regarding a temperature detected by sensor 40 which forms a pair with camera 30 which is mainly used to capture an image. Display/operation unit 503 of smartphone 50 displays Photo icon IC1, Video icon IC2, Voice icon IC3, and a Lullaby icon IC4a so as to be selectable, and also displays an indicator ID1 of the name (for example, the name "Lullaby L1") of a lullaby sound source which is output (reproduced) by the present camera 30 (for example, baby monitoring camera 30C) on the upper side of Lullaby icon IC4a. If a selection operation is performed on Lullaby icon IC4a while audio data of the lullaby sound source of the name "Lullaby L1" is output (reproduced), smartphone 50 transmits an instruction for stopping the output (reproduction) of the audio data of the lullaby sound source of the name "Lullaby L1" to master device 10. If the stop instruction transmitted from smartphone 50 is received, master device 10 transmits the instruction for stopping the output (reproduction) of the audio data of the lullaby sound source of the name "Lullaby L1" to camera 30 (for example, baby monitoring camera 30C). Consequently, camera 30 (for example, baby monitoring camera 30C) stops the output (reproduction) of the audio data of the lullaby sound source of the name "Lullaby L1" which is currently being output (reproduced).

In a case where camera 30 (for example, baby monitoring camera 30C) does not output (reproduce) audio data of a lullaby sound source, smartphone 50 displays Lullaby icon IC4 with a note mark on display/operation unit 503. On the other hand, in a case where camera 30 (for example, baby monitoring camera 30C) is currently outputting (reproducing) audio data of a lullaby sound source, smartphone 50 displays Lullaby icon IC4a with a reproduction stop mark on display/operation unit 503. Consequently, if the user has only to view the Lullaby icon displayed on display/operation unit 503 of smartphone 50, the user can easily judge whether or not audio data of a lullaby sound source is currently being output from camera 30 (for example, baby monitoring camera 30C).

Photo icon IC1, Video icon IC2, Voice icon IC3, and Lullaby icon IC4 are respectively menu icons which are disposed in advance in order to perform various settings corresponding to a still image (Photo), a moving image (Video), sound (Voice such as call voice), and sound source (Lullaby). For example, Photo icon IC1 is an icon which is used to give an instruction for starting recording in camera 30 and to set a function of an image recorded by camera 30. Video icon IC2 is an icon which is used to give an instruction for starting recording in camera 30 and to set a function of an image recorded by camera 30. Voice icon IC3 is an icon which is used to give an instruction for starting bidirectional calls to camera 30 and to set a function of bidirectional calls to camera 30.

In a case where camera 30 (for example, baby monitoring camera 30C) does not output (reproduce) audio data of a lullaby sound source, smartphone 50 displays any one of the lullaby sound source selection screens of FIGS. 7A to 7C on display/operation unit 503 when Lullaby icon IC4 is tapped.

Figure 9:
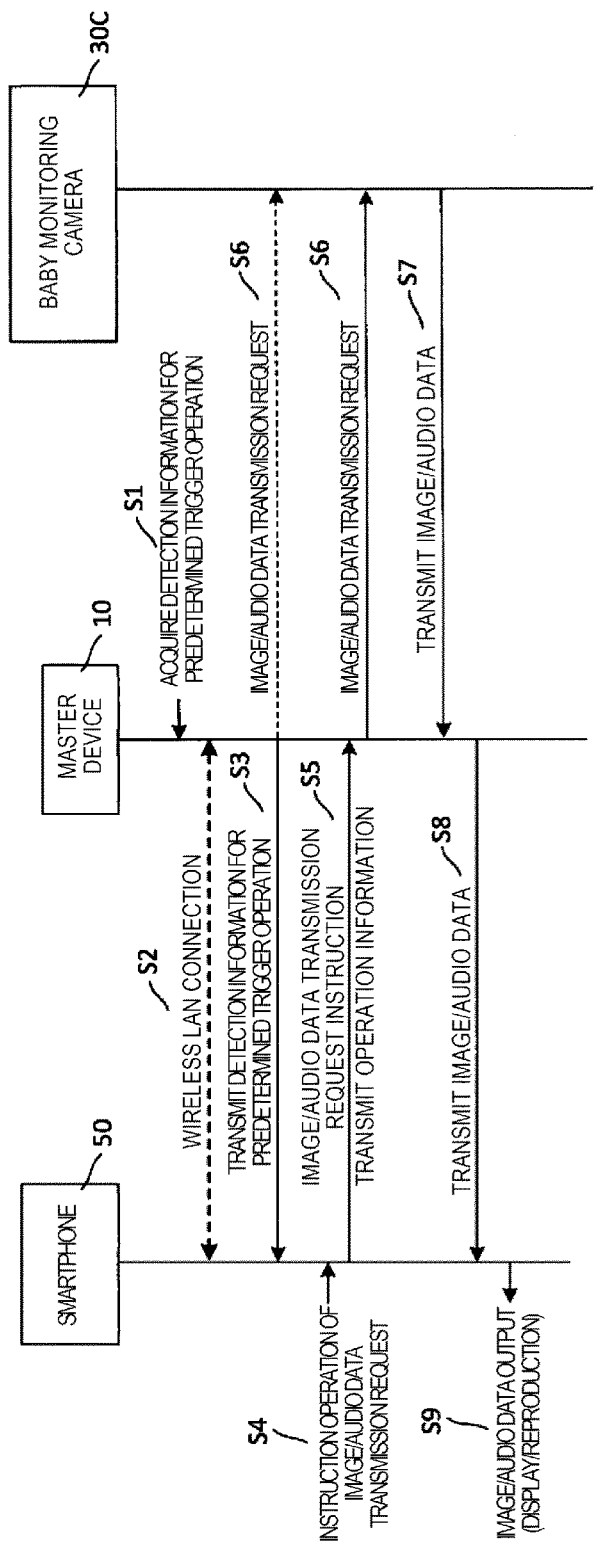
FIG. 9 is a sequence diagram illustrating an example of an operation procedure in which the master device transmits and displays an image which is being recorded by the baby monitoring camera to the smartphone in the monitoring camera system of the present embodiment.

Next, with reference to FIGS. 9, 10 and 11, a description will be made of an operation of monitoring camera system 5 of the present embodiment. FIG. 9 is a sequence diagram illustrating an example of an operation procedure in which master device 10 transmits and displays an image which is being recorded by baby monitoring camera 30C to smartphone 50 in monitoring camera system 5 of the present embodiment. In FIG. 9, for convenience of description, baby monitoring camera 30C is used as an example of camera 30, but other cameras 30 may be used.

It is assumed that a home security application corresponding to monitoring camera system 5 of the present embodiment is installed in smartphone 50 in advance, and this application is activated through a user's input operation.

In FIG. 9, if detection information (for example, a detection signal which is output to master device 10 in a case where human sensor 40B detects a person approaching a baby bed) for a predetermined trigger operation is acquired (step S1), master device 10 performs a wireless communication connection to smartphone 50 by using a wireless LAN (step S2), and transmits the detection information (refer to the above description) for the predetermined trigger operation to smartphone 50 when the wireless LAN connection to smartphone 50 has been completed (step S3).

If an instruction operation of an image/audio data transmission request is received from the user (step S4), smartphone 50 transmits information regarding the instruction operation of an image/audio data transmission request (step S5). If the information regarding the instruction operation is received from smartphone 50, master device 10 requests baby monitoring camera 30C to transmit image/audio data (step S6). Master device 10 may transmit the detection information (refer to the above description) for the predetermined trigger operation to smartphone 50 and may also request baby monitoring camera 30C to transmit image/audio data (step S6).

If the image/audio data transmission request is received from master device 10, baby monitoring camera 30C performs a wireless communication connection to master device 10 by using the wireless LAN, and acquires image data captured by image capturing unit 312 and audio data collected by microphone 328 and transmits the data to master device 10 (step S7). Master device 10 transmits the image data and the audio data transmitted from baby monitoring camera 30C to smartphone 50 (step S8). Smartphone 50 displays the image data transmitted from master device 10 on display/operation unit 503, and outputs the audio data transmitted from master device 10 from speaker 513. Consequently, smartphone 50 can display a live monitoring screen illustrated in FIG. 8 (step S9).

Next, with reference to FIGS. 10 and 11, a description will be made of an operation in which audio data of a lullaby sound source is output (reproduced) from baby monitoring camera 30C in response to a user's input operation on smartphone 50.

Figure 10:
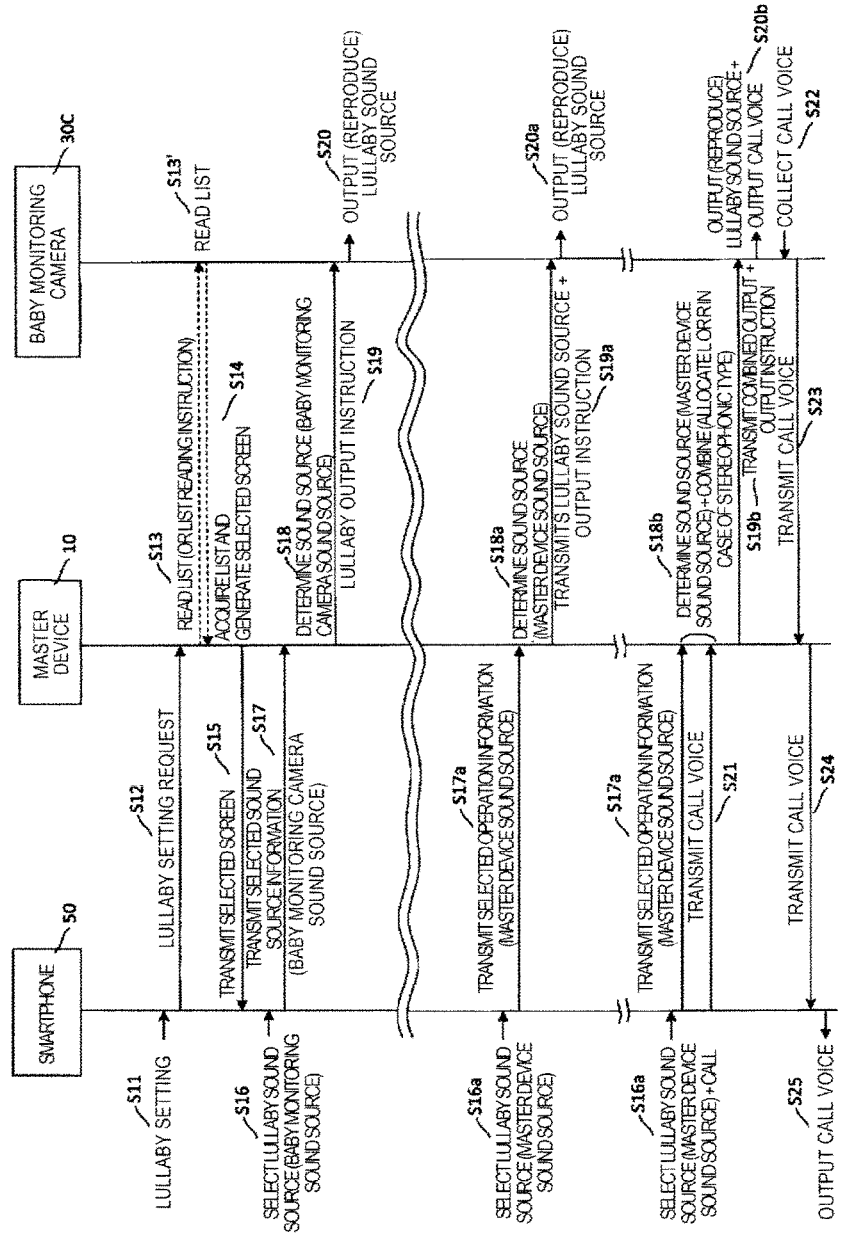
FIG. 10 is a sequence diagram illustrating an example of an operation procedure in the monitoring camera system of the present embodiment in a case where a selection target lullaby sound source is included in the master device or the baby monitoring camera.

FIG. 10 is a sequence diagram illustrating an example of an operation procedure in monitoring camera system 5 of the present embodiment in a case where a selection target lullaby sound source is included in master device 10 or baby monitoring camera 30C. FIG. 11 is a sequence diagram illustrating an example of an operation procedure in monitoring camera system 5 of the present embodiment in a case where a selection target lullaby sound source is included in smartphone 50. In FIG. 11, the same content as in description of FIG. 10 is given the same step number, description thereof will be made briefly or omitted, and different content will be described.

In FIG. 10, if the user performs an operation (for example, a tap operation on Lullaby icon IC4) for giving an instruction for setting a lullaby in a state in which the live monitoring screen illustrated in FIG. 8 is displayed on display/operation unit 503 of smartphone 50 (step S11), smartphone 50 transmits a lullaby setting request to master device 10 (step S12).

If a lullaby setting request is received from smartphone 50, master device 10 reads a lullaby sound source list from storage unit 103 in order to generate any one of the lullaby sound source selection screens illustrated in FIGS. 7A to 7C (step S13). In a case where a lullaby sound source list is not stored in storage unit 103, master device 10 transmits a reading instruction of a lullaby sound source list to baby monitoring camera 30C. Baby monitoring camera 30C reads a lullaby sound source list in response to the reading instruction of a lullaby sound source list from master device 10 (step S13'), and transmits the lullaby sound source list to master device 10.

If the lullaby sound source list is acquired, master device 10 generates any one of the lullaby sound source selection screens illustrated in FIGS. 7A to 7C by using the lullaby sound source list (step S14), and transmits the lullaby sound source selection screen to smartphone 50 (step S15). Consequently, the lullaby sound source list selection screen indicated by any one of lullaby sound source lists BX1 to BX3 of FIGS. 7A to 7C is displayed on display/operation unit 503 of smartphone 50.

Here, it is assumed that the user selects any one of lullaby sound sources on the lullaby sound source list selection screen displayed on smartphone 50 (step S16). It is assumed in step S16 that audio data of a lullaby sound source stored in, for example, baby monitoring camera 30C is selected.

However, smartphone 50 does not recognize that the audio data of the selected lullaby sound source is stored in baby monitoring camera 30C. Smartphone 50 transmits information (for example, the name "Lullaby L6" illustrated in FIG. 7B) regarding the lullaby sound source selected in step S16 to master device 10 (step S17).

If the information (refer to the above description) regarding the lullaby sound source transmitted from smartphone 50 in step S17 is received, master device 10 determines that the selected lullaby sound source (selection target lullaby sound source) is stored in baby monitoring camera 30C on the basis of the information regarding the selected lullaby sound source and the lullaby sound source list acquired in step S14 (step S18). Since it is determined that the selection target lullaby sound source is stored in baby monitoring camera 30C in step S18, master device 10 instructs baby monitoring camera 30C to output (reproduce) the selection target lullaby sound source (step S19).

Baby monitoring camera 30C reads audio data of the selection target lullaby sound source from storage unit 303 and outputs (reproduces) the audio data from speaker 329 in response to the instruction from master device 10 in step S19 (step S20). Since the operations in steps S11 to S15 illustrated in FIG. 10 are performed in advance as the premise of description of processes in steps S16a to S20a or the premise of description of processes of steps S16a to S25, description of the same content will be made briefly or omitted, and different content will be described.

It is assumed that the user selects one lullaby sound source on a lullaby sound source list selection screen displayed on smartphone 50 (step S16a). It is assumed in step S16a that audio data of a lullaby sound source stored in, for example, master device 10 is selected. However, smartphone 50 does not recognize that the audio data of the selected lullaby sound source is stored in master device 10. Smartphone 50 transmits information (for example, the name "Lullaby L1" illustrated in FIG. 7A) regarding the lullaby sound source selected in step S16a to master device 10 (step S17a).

If the information (refer to the above description) regarding the lullaby sound source transmitted from smartphone 50 in step S17a is received, master device 10 determines that the selected lullaby sound source (selection target lullaby sound source) is stored in master device 10 on the basis of the information regarding the lullaby sound source and the lullaby sound source list acquired in step S14 (step S18a). Since it is determined that the selection target lullaby sound source is stored in master device 10 in step S18a, master device 10 transmits audio data of the selection target lullaby sound source read from storage unit 103 and output (reproduction) instruction information of the audio data to baby monitoring camera 30C (step S19a).

Baby monitoring camera 30C outputs (reproduces) the audio data of the selection target lullaby sound source transmitted from master device 10 from speaker 329 in response to the output (reproduction) instruction information of the audio data of the selection target lullaby sound source transmitted from master device 10 in step S19a (step S20a).

In the present embodiment, call voice of the user collected by smartphone 50 and call voice of a call party collected by baby monitoring camera 30C can be transmitted and received in a bidirectional manner via master device 10. For example, in a case where the user utters certain call voice to smartphone 50 along with the lullaby sound source selection operation in step S16a, smartphone 50 transmits the user's voice call to master device 10 (step S21).

If the information (refer to the above description) regarding the lullaby sound source transmitted from smartphone 50 in step S17a and the user's call voice transmitted from smartphone 50 in step S21 are received, master device 10 determines that the selected lullaby sound source (selection target lullaby sound source) is stored in master device 10 on the basis of the information regarding the selected lullaby sound source and the lullaby sound source list acquired in step S14 (step S18b). Master device 10 combines the audio data of the selection target lullaby sound source with the user's call voice (step S18b).

In a case where master device 10 recognizes in advance that baby monitoring camera 30C is of a type of reproducing sound in a stereophonic manner, for example, master device 10 allocates the audio data of the selection target lullaby sound source to a left channel (Lch) and the user's call voice to a right channel (Rch) and combines them with each other. The allocation of audio data to Lch or Rch may be reverse. Master device 10 transmits audio data of the combined output generated in step S18b to baby monitoring camera 30C (step S19b).

Baby monitoring camera 30C outputs (reproduces) the audio data of the combined output transmitted from master device 10 in step S19b from speaker 329 (step S20b). Baby monitoring camera 30C outputs (reproduces) the audio data of the combined output via one channel (ch) in a case of a type of reproducing sound in a monaural manner, and outputs (reproduces) audio data (specifically, the audio data of the selection target lullaby sound source or the user's call voice) corresponding to an allocated channel (specifically, Lch or Rch) via the corresponding channel in the audio data of the combined output.

If voice of a call party (for example, an infant desired to be monitored by the user) of the user is collected (step S22), baby monitoring camera 30C transmits audio data of the collected call voice to master device 10 (step S23). If the audio data of the call voice transmitted from baby monitoring camera 30C is received, master device 10 transmits the audio data to smartphone 50 as it is (step S24). Smartphone 50 outputs the audio data of the call voice of the call party transmitted from master device 10, from speaker 513 (step S25).

In FIG. 11, if a lullaby setting request is received from smartphone 50, master device 10 generates any one of the lullaby sound source selection screens illustrated in FIGS. 7A to 7C, for example, on the basis of whether a lullaby sound source list stored in smartphone 50 is stored in storage unit 103 in advance, or smartphone 50 is requested in order to acquire a lullaby sound source list (step S14c), and transmits the lullaby sound source selection screen to smartphone 50 (step S15). Consequently, the lullaby sound source list selection screen indicated by any one of the lullaby sound source lists BX1 to BX3 of FIGS. 7A to 7C is displayed on display/operation unit 503 of smartphone 50.

Here, it is assumed that the user selects any one of lullaby sound sources on the lullaby sound source list selection screen displayed on smartphone 50 (step S16c). It is assumed in step S16c that audio data of a lullaby sound source (for example, the name "Lullaby L11" illustrated in FIG. 7B) stored in, for example, smartphone 50 is selected. Smartphone 50 transmits the audio data of lullaby sound source (selection target lullaby sound source) selected in step S16c to master device 10 (step S17c).

If the audio data of the selection target lullaby sound source transmitted from smartphone 50 in step S17c is received, master device 10 determines that the selection target lullaby sound source is stored in smartphone 50 on the basis of the lullaby sound source list acquired in step S14c (step S18c). Master device 10 transmits the audio data of the selection target lullaby sound source and an output (reproduction) instruction thereof to baby monitoring camera 30C (step S19c).

Baby monitoring camera 30C outputs (reproduces) the audio data of the selection target lullaby sound source from speaker 329 in response to the instruction from master device 10 in step S19c (step S20).

Similarly, in a case where the user utters certain call voice to smartphone 50 along with the lullaby sound source selection operation in step S16c, smartphone 50 transmits the user's voice call to master device 10 (step S21).

If the audio data of the selection target lullaby sound source transmitted from smartphone 50 in step S17c and the user's call voice transmitted from smartphone 50 in step S21 are received, master device 10 determines that the selected lullaby sound source (selection target lullaby sound source) is stored in smartphone 50 on the basis of the lullaby sound source list acquired in step S14c (step S18d). Master device 10 combines the audio data of the selection target lullaby sound source with the user's call voice (step S18d).

In a case where master device 10 recognizes in advance that baby monitoring camera 30C is of a type of reproducing sound in a stereophonic manner, for example, master device 10 allocates the audio data of the selection target lullaby sound source to a left channel (Lch) and the user's call voice to a right channel (Rch) and combines them with each other. Master device 10 transmits audio data of the combined output generated in step S18d to baby monitoring camera 30C (step S19d).

Baby monitoring camera 30C outputs (reproduces) the audio data of the combined output transmitted from master device 10 in step S19d from speaker 329 (step S20b). Baby monitoring camera 30C outputs (reproduces) the audio data of the combined output via one channel (ch) in a case of a type of reproducing sound in a monaural manner, and outputs (reproduces) audio data (specifically, the audio data of the selection target lullaby sound source or the user's call voice) corresponding to an allocated channel (specifically, Lch or Rch) via the corresponding channel in the audio data of the combined output in a case of a type of reproducing sound in a stereophonic manner.

If voice of a call party (for example, an infant desired to be monitored by the user) of the user is collected (step S22), baby monitoring camera 30C transmits audio data of the collected call voice to master device 10 (step S23). If the audio data of the call voice transmitted from baby monitoring camera 30C is received, master device 10 transmits the audio data to smartphone 50 as it is (step S24). Smartphone 50 outputs the audio data of the call voice of the call party transmitted from master device 10, from speaker 513 (step S25).

As mentioned above, in monitoring camera system 5 of the present embodiment, master device 10 transmits data regarding a lullaby sound source list to smartphone 50 in response to a user's lullaby setting input operation on smartphone 50. Smartphone 50 displays the data regarding the lullaby sound source list transmitted from master device 10 on display/operation unit 503, and transmits information regarding a selection target lullaby sound source which is selected to master device 10 in response to an operation of selecting one lullaby sound source. If the information regarding the selection target lullaby sound source is received from smartphone 50, master device 10 outputs audio data of the selection target lullaby sound source from baby monitoring camera 30C.

Consequently, monitoring camera system 5 can realize data input and output between smartphone 50 and camera 30 (for example, baby monitoring camera 30C) at low cost without damaging user's convenience by using master device 10 which is an existing fixed telephone which is connected to fixed telephone network 85 and can perform a call to another fixed telephone 80. Even if a user of smartphone 50 does not stay at house 8, monitoring camera system 5 can freely select music output from baby monitoring camera 30C of house 8 from a remote location through a simple operation on smartphone 50, and can thus allow an infant to hear music in accordance with a user's or infant's preference, for example, even if the user does not stay with the infant who is a monitoring target in the same room.

In monitoring camera system 5, since master device 10 enables bidirectional sound calls between smartphone 50 and camera 30 (for example, baby monitoring camera 30C), an infant is made to hear sound of a user (for example, a patron of the infant) so as to be relaxed.

In monitoring camera system 5, camera 30 (for example, baby monitoring camera 30C) transmits audio data collected by microphone 328 and image data obtained by image capturing unit 312 to master device 10, and master device 10 transmits the audio data and the image data transmitted from camera 30 (for example, baby monitoring camera 30C) to smartphone 50 in response to a transmission request operation of an image and sound on smartphone 50. Consequently, in monitoring camera system 5, even in a case of not staying near a baby bed in house 8 or at a visit location, the user can easily understand circumstances in which the infant is crying by viewing or listening to an image (video) displayed on smartphone 50 or sound. Therefore, the user makes the infant hear audio data of a favorite lullaby sound source of the user or the infant so as to soothe the infant, through a simple operation on smartphone 50 after understanding of the circumstances.

In monitoring camera system 5, since master device 10 can use audio data stored in any one of master device 10, camera 30 (for example, baby monitoring camera 30C), and smartphone 50 as audio data of a selection target lullaby sound source, for example, audio data of other lullaby sound sources is added to smartphone 50, and thus it is possible to easily increase the number of pieces of music which have not been registered in advance. In a case where there is audio data of a lullaby sound source which is unnecessary for a user or an infant, when the user performs an operation for deleting the audio data of the unnecessary lullaby sound source on smartphone 50, master device 10 transmits a list audio data of lullaby sound sources after being deleted (updated) to master device 10, and thus an existing list can be updated to the latest lullaby sound source list.

In monitoring camera system 5, master device 10 transmits combined audio data in which audio data of call voice of a user transmitted from smartphone 50 is combined with audio data of a selection target lullaby sound source registered in smartphone 50 or master device 10 to camera 30 (for example, baby monitoring camera 30C). Camera 30 (for example, baby monitoring camera 30C) outputs the combined audio data transmitted from master device 10, from speaker 329, and transmits audio data of collected call voice of a call party to master device 10. Master device 10 transmits the audio data of call voice of the call party to smartphone 50, and smartphone 50 outputs the audio data of call voice of the call party transmitted from master device 10.

Consequently, in monitoring camera system 5, even when audio data of a selection target lullaby sound source is registered in any one of smartphone 50, master device 10, and camera 30 (for example, baby monitoring camera 30C), camera 30 (for example, baby monitoring camera 30C) can output audio data of a selection target lullaby sound source selected through a user's operation on display/operation unit 503 of smartphone 50. In monitoring camera system 5, bidirectional calls can be performed between smartphone 50 and camera 30 (for example, baby monitoring camera 30C) via master device 10 while outputting (reproducing) audio data of a selection target lullaby sound source from camera 30 (for example, baby monitoring camera 30C).

Although the various embodiments have been described with reference to the drawings, needless to say, the present invention is not limited to such embodiments. It is obvious that a person skilled in the art can conceive of various modifications or alterations within the scope recited in the claims, and thus it is understood that they naturally fall within the technical scope of the present invention.

What is claimed is:

1. A communication system comprising:
    a monitoring camera that includes a microphone, a speaker, an imager, a first memory configured to store one or more sound sources playable via the speaker, and a communicator; and
    a master device that includes a second memory configured to store one or more sound sources and that, in operation, performs wireless communication with the monitoring camera according to a communications protocol;
    wherein the master device, in operation, transmits a sound source list to a smartphone, and receives from the smartphone information regarding a sound source selected from the sound source list at the smartphone, wherein the smartphone is communicably connected to the master device and is communicably connected to a mobile phone network to communicate with other mobile telephones;
    the master device determines a memory location in which the selected source is stored, the memory location being one of the first memory of the monitoring camera and the second memory of the master device, and, when the selected sound source is stored in the second memory of the master device, transmits the selected sound source to the monitoring camera and instructs the monitoring camera to output the selected sound source via the speaker of the monitoring camera, and, when the selected sound source is stored in the first memory of the monitoring camera, instructs the monitoring camera to output the selected sound source stored in the monitoring camera via the speaker of the monitoring camera; and
    the master device, when the selected sound source is outputted via the speaker of the monitoring camera, transmits a first icon indicative of the selected sound source being played to the smartphone for display.

2. The communication system of claim 1, wherein
    the monitoring camera, in operation, transmits voice data captured by the microphone and image data captured by the imager to the master device; and
    the master device, in response to a user operation on the smartphone, forwards the voice data and the image data received from the monitoring came to the smartphone.

3. The communication system of claim 1, wherein
    the master device, in operation, receives a first caller's voice captured by the smartphone, combines the first caller's voice with the selected sound source to form a combined voice data, and transmits the combined voice data to the monitoring camera,
    the monitoring camera outputs the combined voice data received from the master device via the speaker, and transmits a second caller's voice data captured by the microphone of the monitoring camera to the master device, and
    the master device forwards the second caller's voice data received from the monitoring camera to the smartphone.

4. The communication system of claim 1, wherein the master device and the smartphone communicate with each other via a wireless router.

5. The communication system of claim 1, which is a baby monitoring system.

6. The communication system of claim 5, wherein the sound source list lists lullabies.

7. A sound source replay method based on a communication system, the communication system comprising: (a) a monitoring camera that includes a microphone, a speaker, an imager, a first memory configured to store one or more sound sources playable via the speaker, and a communicator; and (b) a master device that includes a second memory configured to store one or more sound sources and that, in operation, performs wireless communication with the monitoring camera according to a communications protocol, the sound source replay method comprising:
    transmitting, from the master device, a sound source list to a smartphone, wherein the smartphone is communicably connected to the master device and is communicably connected to a mobile phone network to communicate with other mobile telephones,
    receiving, at the master device, information regarding a sound source selected from the sound source list at the smartphone,
    determining, at the master device, a memory location in which the selected source is stored, the memory location being one of the first memory of the monitoring camera and the second memory of the master device,
    transmitting, from the master device to the monitoring camera when the selected sound source is stored in the second memory of the master device, the selected sound source and an instruction to output the selected sound source via the speaker of the monitoring camera,
    transmitting an instruction from the master device to the monitoring camera, when the selected sound source is stored in the first memory of the monitoring camera, to output the selected sound source via the speaker of the monitoring camera, and
    transmitting, from the master device, a first icon indicative of the selected sound source being played to the smartphone for display when the selected sound source is outputted via the speaker of the monitoring camera.

8. The sound source replay method of claim 7, further comprising:
    transmitting, from the monitoring camera, voice data captured by the microphone and image data captured by the imager to the master device; and
    forwarding, from the master device in response to a user operation on the smartphone, the voice data and the image data received from the monitoring came to the smartphone.

9. The sound source replay method of claim 7, further comprising:
    receiving, at the master device, a first caller's voice captured by the smartphone, combining, at the master device, the first caller's voice with the selected sound source to form a combined voice data, transmitting, from the master device, the combined voice data to the monitoring camera, outputting, at the monitoring camera, the combined voice data via the speaker, transmitting, from the monitoring camera, a second caller's voice data captured by the microphone to the master device, and forwarding, from the master device, the second caller's voice data received from the monitoring camera to the smartphone.

10. The sound source replay method of claim 7, wherein the master device and the smartphone communicate with each other via a wireless router.

11. The sound source replay method of claim 7, wherein the communication system is a baby monitoring system.

12. The sound source replay method of claim 11, wherein the sound source list lists lullabies.

13. The communication system of claim 1, wherein the master device, in operation, receives image data captured by the imager of the monitoring camera and forwards the image data to the smartphone for display adjacent to the first icon.

14. The communication system of claim 1, wherein the master device, in operation, transmits a second icon instructive of stopping the output of the selected sound source to the smartphone for display adjacent to the first icon and, in response to receiving user selection of the second icon on the smartphone, stops the output of the selected sound source.

15. The sound source replay method of claim 7, comprising:

forwarding, from the master device, image data captured by the imager of the monitoring camera to the smartphone for display adjacent to the first icon.

16. The sound source replay method of claim 7, comprising:

transmitting, from the master device, a second icon instructive of stopping the output of the selected sound source to the smartphone for display adjacent to the first icon, and stopping the output of the selected sound source in response to receiving user selection of the second icon on the smartphone.

17. The communication system of claim 1, wherein the master device and the monitoring camera communicate with each other according to a DECT (Digital Enhanced Cordless Telecommunications) protocol.

18. The sound source replay method of claim 7, wherein the master device and the monitoring camera communicate with each other according to a DECT (Digital Enhanced Cordless Telecommunications) protocol.

* * * * *